United States Patent

Suzuki et al.

[11] Patent Number: 5,778,691
[45] Date of Patent: Jul. 14, 1998

[54] GAS INJECTION TYPE HEAT PUMP APPARATUS

[75] Inventors: Takahisa Suzuki, Kariya; Yuuji Takeo, Toyoake; Yukikatsu Ozaki, Nishio, all of Japan

[73] Assignee: Denso Corporation, Kariya, Japan

[21] Appl. No.: 889,216

[22] Filed: Jul. 8, 1997

[30] Foreign Application Priority Data

Jul. 12, 1996 [JP] Japan ................... 8-183722

[51] Int. Cl.$^6$ .................................................. F25B 13/00
[52] U.S. Cl. ................... 62/160; 62/180; 62/184; 62/186
[58] Field of Search ............... 62/160, 177, 178, 62/179, 180, 181, 183, 184, 186

[56] References Cited

U.S. PATENT DOCUMENTS

| 5,181,392 | 1/1993 | Itoh et al. ............... 62/184 X |
| 5,533,352 | 7/1996 | Bahel et al. ............ 62/186 X |
| 5,634,348 | 6/1997 | Ikeda et al. ............. 62/160 |

FOREIGN PATENT DOCUMENTS

| A-63-116060 | 5/1988 | Japan . |
| A-3-156251 | 7/1991 | Japan . |
| A-4-366369 | 12/1992 | Japan . |

*Primary Examiner*—Harry B. Tanner
*Attorney, Agent, or Firm*—Harness, Dickey & Pierce, PLC

[57] ABSTRACT

According to the present invention, in a gas injection type heat pump apparatus, the high-pressure side pressure of refrigeration cycle is detected in a heating operation, and an upper limit value of an amount of air passing through an inside heat exchanger is determined based on the detection value. The upper limit value and a set air amount set by an air amount switching lever are compared. When the set air amount is larger than the upper limit value, the amount of the air passing through the inside heat exchanger is restricted within the upper limit value. In this way, the high-pressure side pressure increases, and an intermediate pressure in a gas-liquid separator also increases. Therefore, the gas injection amount can be increased, and a heating capacity can be effectively improved.

11 Claims, 5 Drawing Sheets

GAS INJECTION TYPE HEAT PUMP APPARATUS

CROSS REFERENCE TO THE RELATED APPLICATION

This application is based on and claims priority of Japanese Patent Application No. Hei. 8-183722 filed on Jul. 12, 1996, the content of which is incorporated herein by reference.

BACKGROUND OF THE INVENTION

1. Field of the Invention

The present invention relates to a gas injection type heat pump to improve a heating capacity thereof. The present invention is suitably employed in an air conditioning apparatus for a vehicle, and especially in a heat pump system for air-conditioning, for an electric vehicle used in cold district.

2. Description of Related Art

The Applicant has proposed in the U.S. patent application Ser. No. 08/681,837 that, in a gas injection type heat pump, an electric type expansion valve as decompressing means at the high-pressure side is disposed at an upstream side of a gas-liquid separator at an intermediate pressure, a throttling amount of the electric expansion valve is controlled to increase the intermediate pressure of the gas-liquid separator, and an amount of the gas injected into a compressor is increased so that the heating capacity is improved.

The inventors have variously studied and examined the above-described apparatus and found out that the following problem occurs.

That is, immediately after heating operation is started when a temperature of the outside air is low, if an amount of air to be blown into a passenger compartment is large by a setting operation of an user, a condensing capacity of an inside heat exchanger (condenser in the heating operation) is increased; and therefore, even if a rotational speed of the compressor is the maximum rotational speed, the pressure is not increased so high that the gas injection amount cannot be increased.

FIG. 9 shows a Mollier diagram in the gas injection type heat pump. Under a condition that the temperature of outside air and the rotational speed of the compressor are constant, the chain line shows a case where the amount of air passing through the inside heat exchanger is large (the air amount is 350 m³/h), and the solid line shows a case where the amount of air passing through the inside heat exchanger is small (the air amount is 180 m³/h). As being understood from the chain line and the solid line in FIG. 9, when the amount of air passing through the inside heat exchanger is large, the gas injection amount may be greatly reduced as compared with when the amount of air passing through the inside heat exchanger is small.

Accompanied with the remarkable decrease of the gas injection, an amount of refrigerant circulating into the inside heat exchanger is reduced, and the improvement of the heating capacity by the gas injection may be reduced. When the improvement of the heating capacity is be reduced, it is vicious that an increase of the pressure becomes slow and the gas injection amount cannot be increased.

SUMMARY OF THE INVENTION

In view of the above, the present invention has an object to improve the heating capacity by increasing the gas injection amount in the gas injection type heat pump apparatus.

According to the present invention, in a gas injection type heat pump apparatus, a physical amount relative to high-pressure side pressure is detected in a heating operation, and an upper limit value of an amount of air passing through an inside heat exchanger is determined based on the detection value. The upper limit value and a set air amount set by air amount setting means are compared. When the set air amount is larger than the upper limit value, the amount of the air passing through the inside heat exchanger is restricted within the upper limit value. In this way, the high-pressure side pressure increases, and an intermediate pressure in a gas-liquid separator also increases. Therefore, the gas injection amount can be increased, and a heating capacity can be effectively improved.

BRIEF DESCRIPTION OF THE ACCOMPANYING DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1:
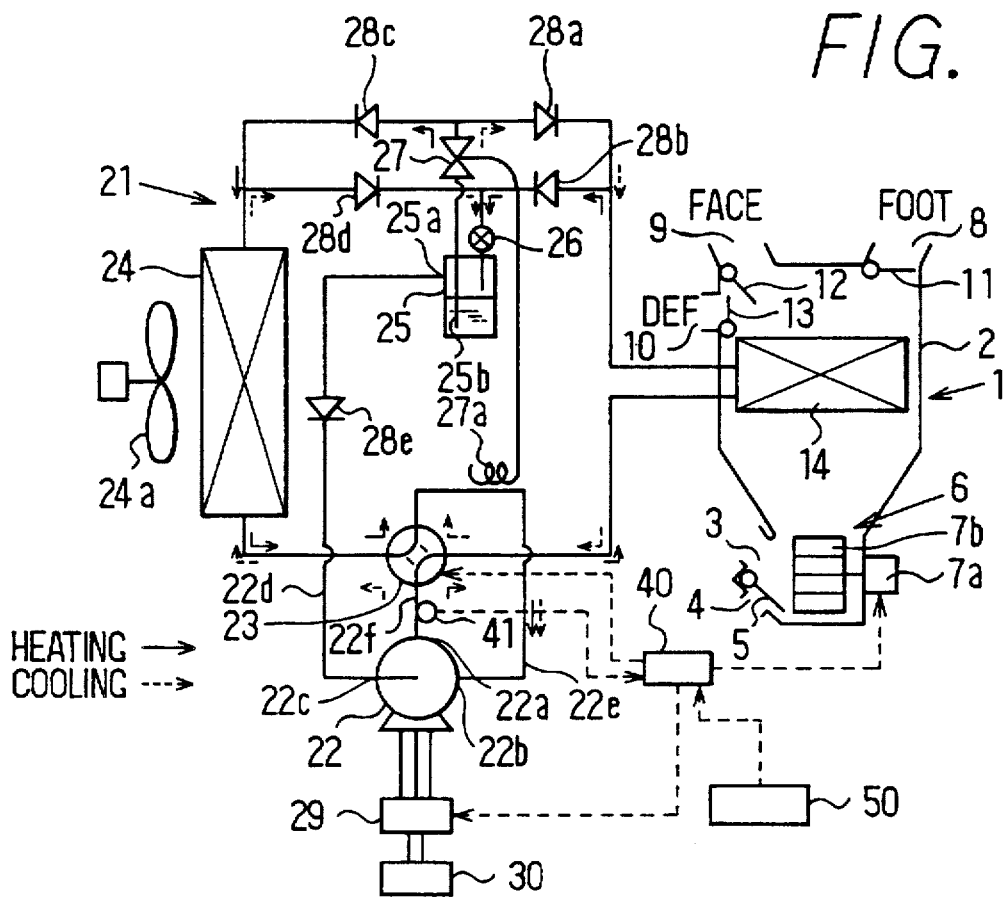
FIG. 1 is a view showing an entire construction according to a first embodiment of the present invention.

A first embodiment in which the present invention is employed in an air conditioning apparatus for an electric vehicle will be described with reference to FIGS. 1 to 6. Firstly, an entire construction of the embodiment will be described.

An air conditioning unit 1 is disposed in a passenger compartment of an electric vehicle, and an air conditioning duct 2 thereof constructs an air passage for introducing conditioned air into the passenger compartment. At one end side of the air conditioning duct 2, there are provided suction inlets 3 and 4 for sucking inside air and outside air, respectively. The inside air suction inlet 3 and the outside air suction inlet 4 are selectively opened and closed by an inside air/outside air switching door 5, and the inside air/outside air switching door 5 is actuated by a servomotor (not shown).

Within the air conditioning duct 2, a blower 6 for generating an air flow is disposed adjacent to the suction inlets 3 and 4. The blower 6 includes a fan motor 7a and a centrifugal fan 7b actuated by the fan motor 7a.

On the other hand, at the other end side of the air conditioning duct 2, there are formed a foot air outlet 8 for blowing conditioned air toward feet of a passenger in the passenger compartment, a face air outlet 9 for blowing conditioned air toward an upper half body of the passenger in the passenger compartment, and a defroster air outlet 10 for blowing conditioned air toward an inner surface of a windshield of the vehicle. Air passages of these air outlets 8–10 are opened or closed by doors 11–13, respectively, and each of doors 11–13 is actuated by a servomotor (not shown).

Within the air conditioning duct 2 at an air downstream side of the blower 6, there is provided an inside heat exchanger 14. The inside heat exchanger 14 constructs a part of a refrigeration cycle 21 described later, and functions as a condenser in a heating operation mode, which radiates condensation latent heat of the refrigerant to heat air in the duct 2. On the other hand, in a cooling operation mode, the inside heat exchanger functions as an evaporator, which absorbs evaporation latent heat of the refrigerant from air in the air conditioning duct 2 to dehumidify and cool the air.

The refrigeration cycle 21 is constructed as the gas injection type heat pump in which the heating and cooling operation for the passenger compartment is performed by the inside heat exchanger 14 and includes the following components in addition to the inside heat exchanger 14. That is, the refrigeration cycle 21 further includes a compressor 22 for sucking, compressing and discharging the refrigerant, an electromagnetic four way valve 23 for switching a flow of the refrigerant, an outside heat exchanger 24, a gas-liquid separator 25, a fixed throttle (first decompressing means) 26 for decompressing high pressure side refrigerant to an intermediate pressure (e.g., approximately 4–13 kg/cm$^2$), a temperature responding type expansion valve (second decompressing means) 27, and check valves 28a–28e.

The above-described compressor 22 is of an electric type and is actuated by an electric motor (not shown) to suck, compress, and discharge the refrigerant. The electric motor is disposed integrally with the compressor 22 in a sealed case, and an electric power supplied to the electric motor is controlled by the an inverter 29 so that a rotational speed of the compressor 22 is continuously changed.

The inverter 29 is connected to a battery mounted on the vehicle 30, and an electric current supplied to the inverter 29 is controlled by a control unit 40.

The above-described compressor 22 is provided with a discharge port 22a for discharging the compressed refrigerant, a suction port 22b for sucking the low-pressure side refrigerant in the cycle, and a gas injection port 22c through which gas refrigerant having an intermediate pressure, which is separated in the gas-liquid separator 25, is injected. The gas injection port 22c communicates with a gas refrigerant outlet 25a formed on an upper portion of the gas-liquid separator 25 through a gas injection passage 22d having a check valve 28e.

In a refrigerant suction passage 22e connected to the suction port 22b, a temperature sensing bulb 27a of the temperature responding type expansion valve 27 is disposed, and an opening degree (throttling amount) of the expansion valve 27 is adjusted in such a manner that a superheating degree of the refrigerant in the suction passage 22e is set to a predetermined value.

The outside heat exchanger 24 is disposed at such a position as to receive air flowing outside the passenger compartment readily, generated by the running vehicle, and performs heat exchange with outside air blown from the electric outside fan 24a. An operation of the electric outside fan 24a is controlled by the control unit 40.

In a refrigerant discharge passage 22f through which the high-pressure gas refrigerant discharged from the discharge port 22a of the compressor 22 flows, there is provided a pressure sensor 41 for detecting a pressure of the high-pressure side refrigerant in the cycle, and a detection signal of the pressure sensor 41 is input to the control unit 40. To the control unit 40, to control the air conditioning apparatus, there are respectively input detection signals from an outside air temperature sensor (not shown) for detecting a temperature of outside air, an inside air temperature sensor (not shown) for detecting a temperature of air in the passenger compartment, an in-duct temperature sensor (not shown) for detecting a temperature of air having just passed through the inside heat exchanger 24, an outside heat exchanger outlet temperature sensor (not shown) for detecting a temperature of the refrigerant having just passed through the outside heat exchanger, and the like.

To the control unit 40, there are respectively input signals from each lever and each switch of an air conditioning control panel 50.

Figure 2:
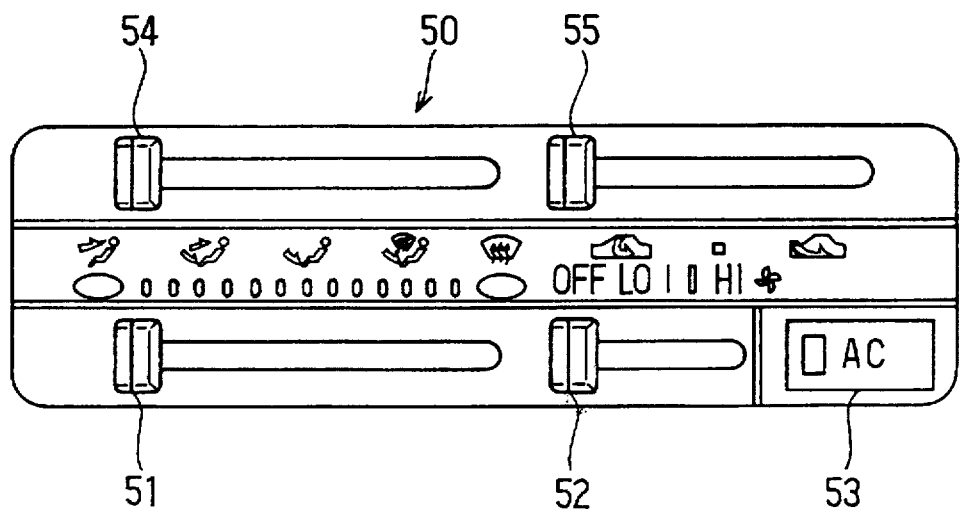
FIG. 2 is a front view of an air conditioning control panel in the first embodiment.

On the control panel 50, as shown in FIG. 2, there are provided a temperature setting lever 51 for setting a target value of the temperature of air to be blown into the passenger compartment, an air amount switching lever (air amount setting means) for switching an amount of air blown by the blower 6, an air conditioning switch 53 for intermitting an operation of the compressor 22, an air outlet mode switching lever 54 for switching an air outlet mode to be set, and an inside air/outside air switching lever 55 for switching the inside air/outside air suction mode, which are manually operated by a passenger.

Figure 3:
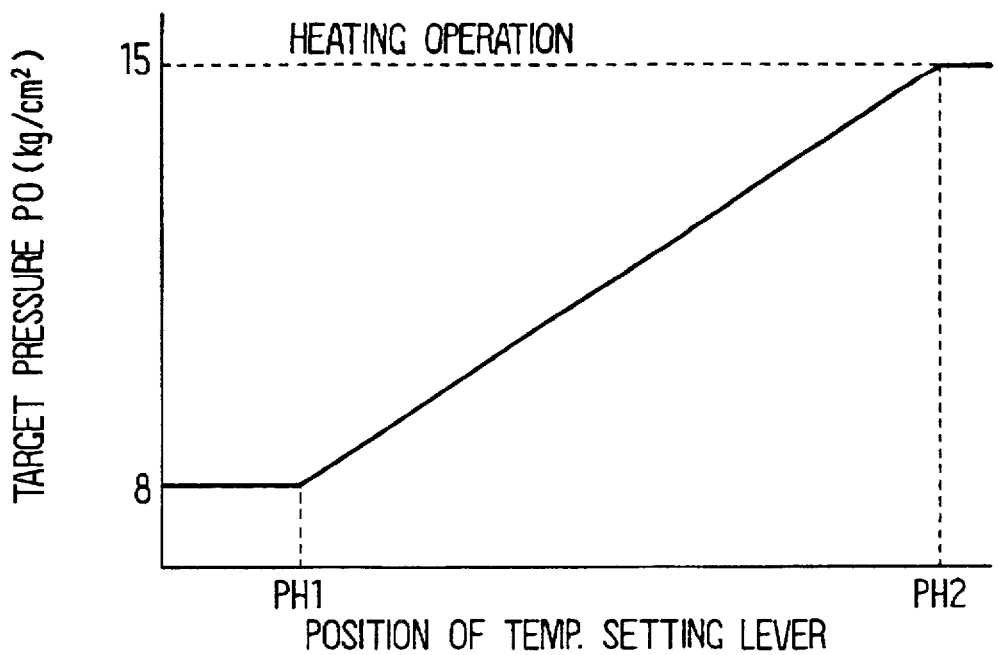
FIG. 3 is a characteristic graph showing a relationship between a set position of a temperature setting lever and a target high pressure in a heating operation in the first embodiment.

The temperature setting lever 51 is temperature setting means for setting a target value of the air to be blown into the passenger compartment, and the control unit 40 determines, in the heating operation mode, a target value of the air heating degree in the inside heat exchanger (more specifically, the pressure of the refrigerant discharged from the compressor 22, i.e., the high-pressure side pressure) according to the set position of the lever 51, as shown in the characteristics of FIG. 3.

Figure 4:
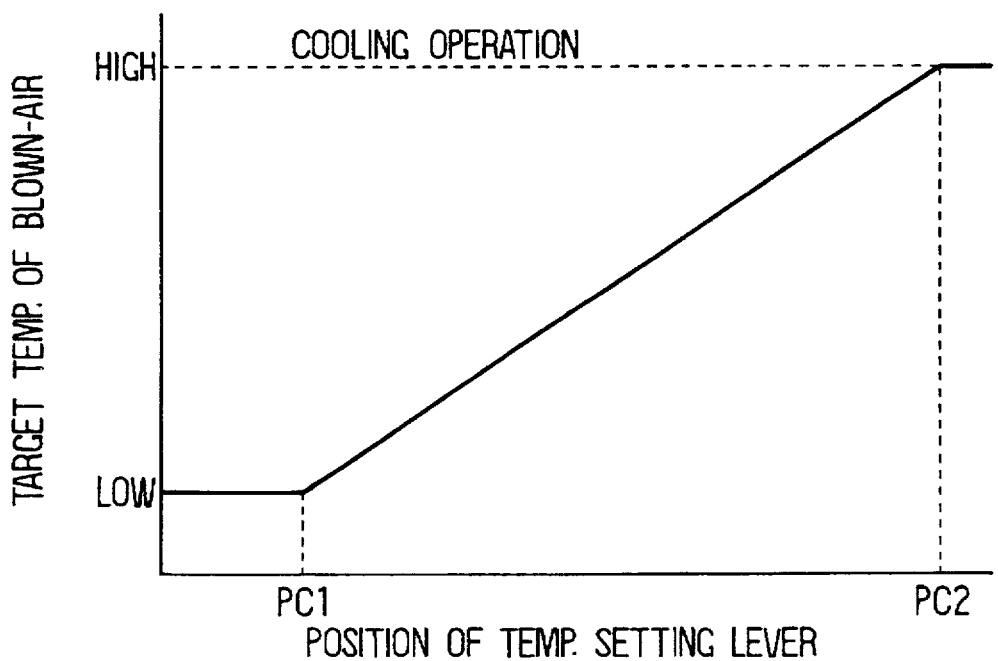
FIG. 4 is a characteristic graph showing a relationship between a set position of a temperature setting lever and a target temperature of blown-air in a cooling operation in the first embodiment.

On the other hand, in the cooling operation mode, the control unit 40 determines that a target value of the air cooling degree in the inside heat exchanger 14 (more specifically, the temperature of the air having just passed through the heat exchanger 14) according to the set position of the lever 51, as shown in the characteristics of FIG. 4.

The temperature setting lever 51 functions also as a lever which determines an operation mode of the refrigeration cycle 21, and the control unit 40 switches the operation mode of the refrigeration cycle 21 according to the set position of the lever 51. That is, the control unit 40 controls the four way valve 23 such that the operation mode of the refrigeration cycle 21 is changed from the cooling operation mode to the heating operation mode according to a movement of the lever 51 from the left side to the right side in FIG. 2.

In the control unit 40, there is provided a microcomputer (not shown) composed of a CPU, a ROM, a RAM and the like, and signals from each of sensors and the control panel 50 are input to the microcomputer through an input circuit (not shown) in the control unit 40.

The microcomputer performs a predetermined process (described later) and controls based on the result the fan motor 7a, the electromagnetic four way valves 23, the electric outside fan 24a, the inverter 30, and the like. The control unit 40 is supplied with an electric current from the battery 31 when a key switch (not shown) of the vehicle is turned on.

In the above-described construction, an operation of the embodiment will be described. When the air conditioning switch 53 is turned on, the signal thereof is input to the control unit 40, and the compressor 22 is started. Then, when the cooling operation mode is set by the temperature setting lever 51, the refrigerant flows in a route of an arrow shown by a chain line in FIG. 1.

The gas refrigerant having a high-temperature and a high-pressure, discharged from the compressor 22, passes through the four way valve 23, flows into the outside heat exchanger 24, and is condensed therein by being heat-exchanged with the outside air blown by the outside fan 24a. Next, the refrigerant flowed out of the outside heat exchanger 24 passes through the check valve 28d and is decompressed in the fixed throttle to be in gas and liquid two phase state having an intermediate pressure.

The gas and liquid two phase refrigerant having the intermediate pressure flows into the gas-liquid separator 25 and is separated therein into saturated gas refrigerant and saturated liquid refrigerant. The gas refrigerant flows from the gas refrigerant outlet 25a formed on the upper portion of the gas-liquid separator 25 through the gas injection passage 22d and the check valve 28e to the gas injection port 22c. Then, the gas refrigerant having the intermediate pressure is injected from the gas injection port 22c to a portion, which is in a compressing process, of the compressor 22.

On the other hand, the liquid refrigerant in the gas-liquid separator 25 flows out through a liquid refrigerant outlet 25b opened adjacent to a bottom portion of the gas-liquid separator 25, and is decompressed in the temperature responding type expansion valve to be in gas and liquid two phase state having a low temperature and a low pressure. The low-pressure refrigerant, after having passed through the check valve 28a, flows into the inside heat exchanger 14. The refrigerant in the heat exchanger 14 evaporates while absorbing the air blown by the blower 6. The cool air, cooled while a heat of which is absorbed in the heat exchanger 14, is usually blown out into the passenger compartment through the face air outlet 9. In this way, the cooling operation for the passenger compartment is performed.

The gas refrigerant evaporated in the cooling inside heat exchanger 14 is sucked from the refrigerant suction passage 22e into the suction port 22b of the compressor 22. At this time, the temperature of the refrigerant to be sucked into the compressor 22 is detected by the temperature sensing bulb 27a and is transmitted to the expansion valve 27; and therefore, the expansion valve 27 adjusts an amount of the refrigerant flowing into the heat exchanger 14 in such a manner that the refrigerant to be sucked into the compressor 22 has a predetermined superheating degree.

Next, when the heating operation mode is set by the temperature setting lever 51, the refrigerant flows in a route of an arrow shown by a solid line in FIG. 1.

That is, the high-pressure refrigerant discharged from the compressor 22 passes through the four way valve 23, flows into the inside heat exchanger 14 at first, and the gas refrigerant is condensed therein by being heat-exchanged with air blown by the blower 6. The warm air, heated by radiating the condensation latent heat of the gas refrigerant, is blown out into the passenger compartment mainly through the foot air outlet 8. In this way, the heating operation for the passenger compartment is performed.

The inside heat exchanger 14 flowed out of the inside heat exchanger 14 passes through the check valve 28b, and then is decompressed in the fixed throttle 26 to be in gas and liquid two phase state having an intermediate pressure. The gas and liquid two phase refrigerant having the intermediate pressure flows into the gas-liquid separator 25, and the separated gas refrigerant flows from the gas refrigerant outlet 25a on the upper portion of the gas-liquid separator 25 through the gas injection passage 22d and the check valve 28e to the gas injection port 22c.

On the other hand, the liquid refrigerant in the gas-liquid separator 25 flows out through the liquid refrigerant outlet 25b and is decompressed in the temperature responding type expansion valve. The refrigerant, after having passed through the check valve 28c, flows into the outside heat exchanger 24. The refrigerant in the outside heat exchanger 24 evaporates while absorbing the air (outside air) blown by the outside blower 24a.

The gas refrigerant evaporated in the outside heat exchanger 24 passes through the four way valve 23 and is sucked into the suction port 22b of the compressor 22 through the refrigerant suction passage 22e.

Next, a control for an amount of blown-air in the heating operation by the microcomputer of the control unit 40 will be described with reference to a flow chart of FIG. 5.

Figure 5:
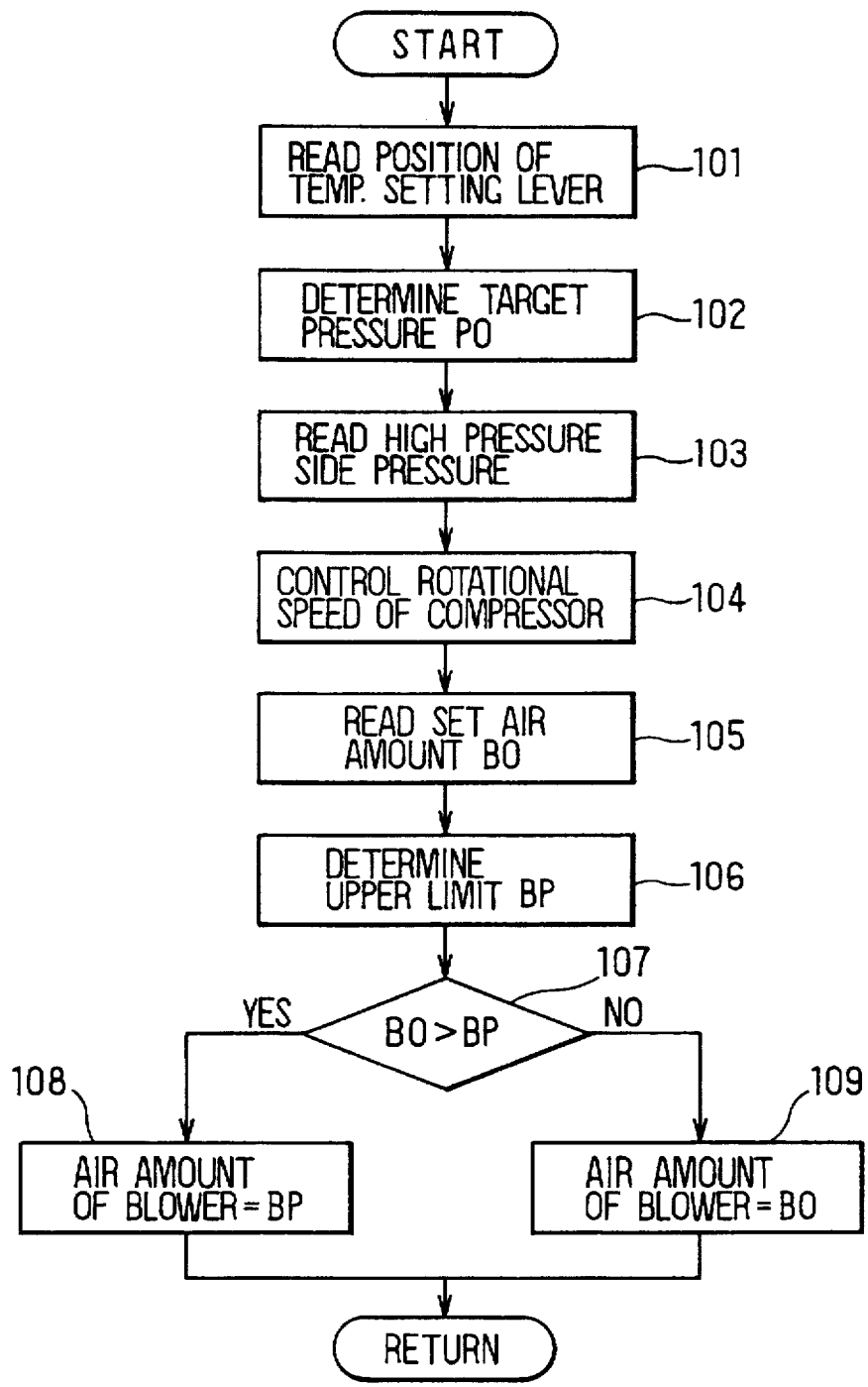
FIG. 5 is a control flow chart executed by a microcomputer in the first embodiment.

When the key switch is turned on and an electric current is supplied to the control unit 40, a routine of FIG. 5 is started. At step 101, a set position of the temperature setting lever 51 of the air conditioning control panel 50 is read. At next step 102, the target high-pressure side pressure PO corresponding to the set position of the temperature setting lever 51 is determined according to the characteristics of FIG. 3 (a map stored in the ROM).

At next step 103, an actual high pressure detected by the pressure sensor 41 is read. At next step 104, a rotational speed of the compressor 22 is controlled in such a manner that the actual high pressure is set to the target high pressure side pressure PO. More specifically, a deviation between the actual high pressure and the target high pressure side pressure PO is calculated, and an electric power supplied to the electric motor of the compressor 22 is controlled by the inverter 29 according to the deviation.

At next step 105, an air amount BO set by the air amount switching lever 52 in the air conditioning control panel 50 is read.

Figure 6:
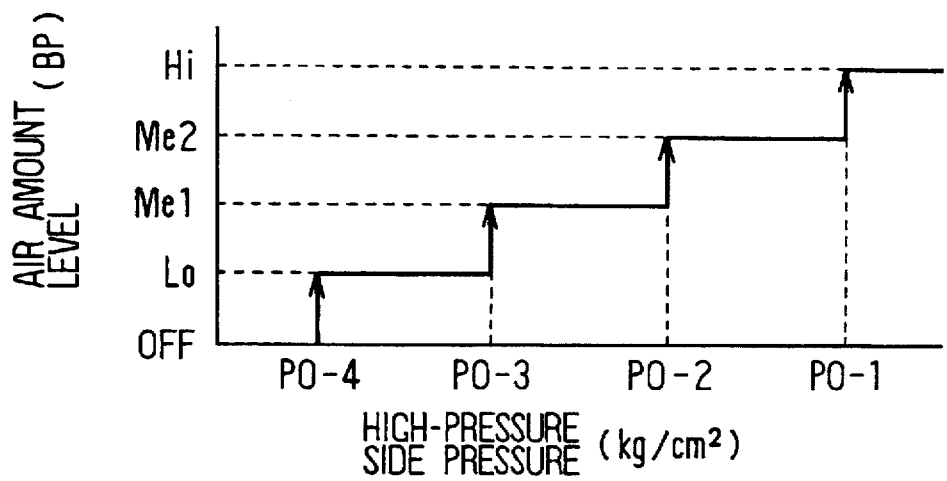
FIG. 6 is a characteristic graph showing a relationship between high-pressure side pressure and air amount level of a blower in the heating operation in the first embodiment.

At next step 106, an upper limit value BP of the air amount of the blower is determined based on the actual high pressure detected by the pressure sensor 41 according to the characteristics of FIG. 6 (a map stored in the ROM). The characteristics of FIG. 6 will be described. In FIG. 6, the abscissa represents the actual high pressure detected by the pressure sensor 41, and the divisions of PO-4 to PO-1 mean the pressure values which are the target high-pressure side pressure PO minus 4 to 1 (Kg/cm$^2$), respectively. The ordinate represents the air amount level of the blower 6, and the air amount increases stepwise from Lo to Hi.

For example, when the actual high pressure is between PO-3 and PO-2, it is determined that the upper limit value BP of the air amount of the blower 6 is set to the Mel level.

At next step 107, it is determined whether the set air amount BO is larger than the upper limit value BP. When the set air amount BO is larger than the upper limit value BP, it proceeds to step 108, and the air amount of the blower 6 is compulsorily set to the upper limit value BP.

As being understood from the characteristics of FIG. 6, the upper limit value BP is set to be smaller in accordance with a decrease of the actual high pressure; and therefore, the air amount of the blower 6 is compulsorily restricted to a smaller value in accordance with a decrease of the actual high pressure. That is, immediately after the heating operation is started in a case of low-temperature outside air, even if an user set the set air amount BO for the Hi-level shown in FIG. 6, for example, when the actual high pressure is low, the air amount of the blower 6 is compulsorily restricted to a small value.

Figure 9:
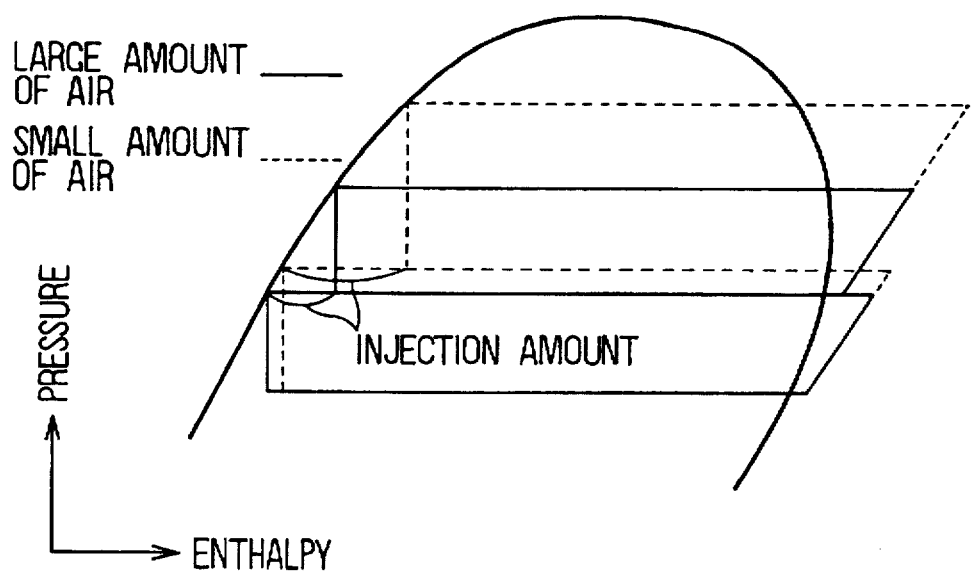
FIG. 9 is a Mollier diagram for explaining an operation of the present invention.

By the restriction of the air amount of the blower 6, the amount of air passing through the inside heat exchanger 14 is restricted, and the condensing capacity is decreased. Therefore, the high-pressure side pressure increases as compared with when the large amount of air (e.g., Hi-level). By the increase of the high-pressure side pressure, the intermediate pressure increases as shown in a Mollier diagram shown by a chain line in FIG. 9 so that the amount of the gas injection increases. By the increase of the amount of the gas injection, the amount of the refrigerant circulating into the inside heat exchanger 14 increases so that the heating capacity can be improved. In addition, by the increase of the amount of the refrigerant circulating into the inside heat exchanger 14, the high-pressure side pressure further increases, with the result that the heating capacity is further improved.

On the other hand, at step 107, when it is determined that the set air amount is smaller than the, upper limit value BP, it proceeds to step 109, and the air amount of the blower 6 is set to the set air amount BO.

When the actual high pressure decreases to be lower than PO-4, the air amount level is set to a OFF, and the blower 6 is stopped to increase the high-pressure side pressure rapidly.

As described above, in this embodiment, even if the user set the set air amount BO for the large amount of air (e.g., Hi-level) in the heating operation mode, the air amount of the blower 6 (the amount of the air passing through the inside heat exchanger 14) can be restricted within the upper limit value BP determined based on the high-pressure side pressure of the refrigeration cycle; and therefore, the high-pressure side pressure can be increased as compared with when the large amount of the air is set, the amount of the gas injection is increased to improve the heating capacity.

In the first embodiment, the step 106 constructs air amount upper limit value determination means for determining the upper limit value BP of the amount of the air passing through the inside heat exchanger 14, and the step 107 constructs determination means for determining whether or not the set air amount set by the air amount switching lever (air amount setting means) 52 is larger than the upper limit value BP. Further, the step 108 constructs first control means for restricting the amount of the air passing through the inside heat exchanger 14 to the upper limit value BP when it is determined that the set air amount BO is larger than the upper limit value BP, and the step 109 constructs second control means for setting the amount of the air passing through the inside heat exchanger 14 to the set air amount BO.

A second embodiment of the present invention will be described with reference FIG. 7.

Figure 7:
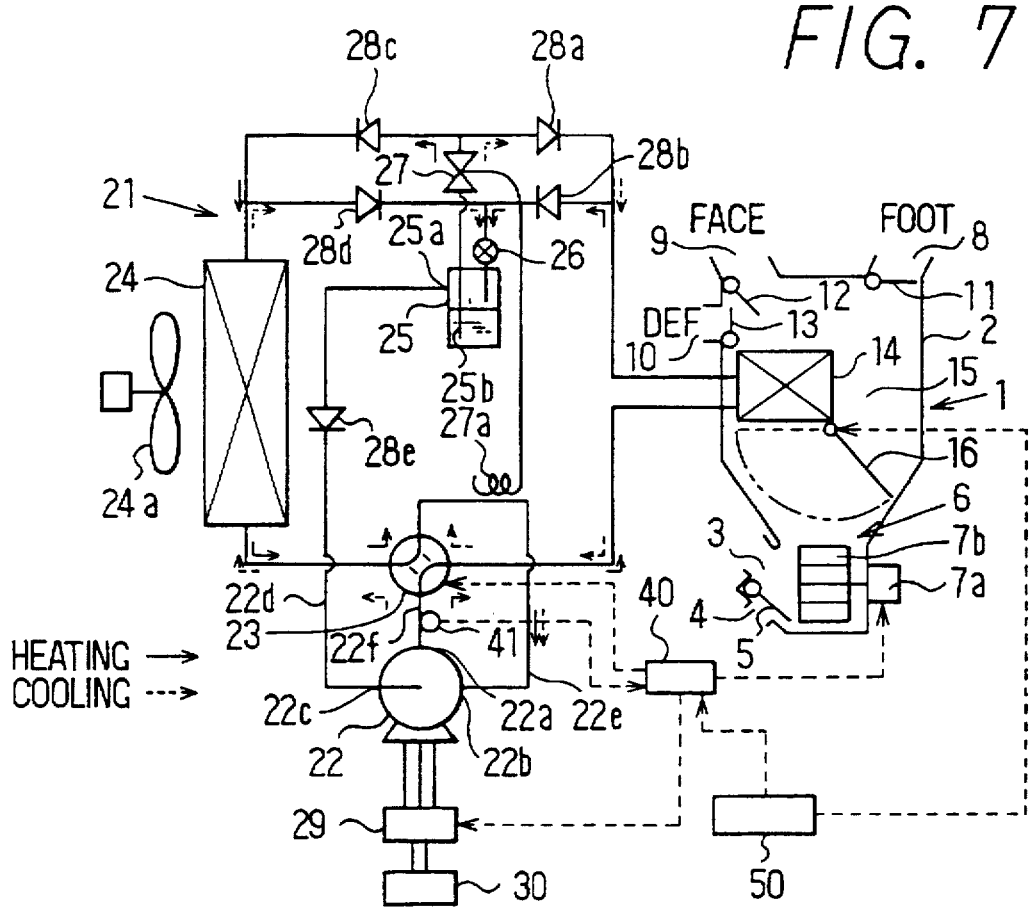
FIG. 7 is a view showing an entire construction according to a second embodiment of the present invention.

In FIG. 7, a bypass passage 15 is formed at a side of the inside heat exchanger 14 in the duct 2, and there is provided an air mixing door 16 (door member) for separating air passing through the inside heat exchanger 14 and air passing through the bypass passage 15. By an opening degree of the air mixing door 16, the amount of the air passing through the inside heat exchanger 14 can be controlled.

Figure 8:
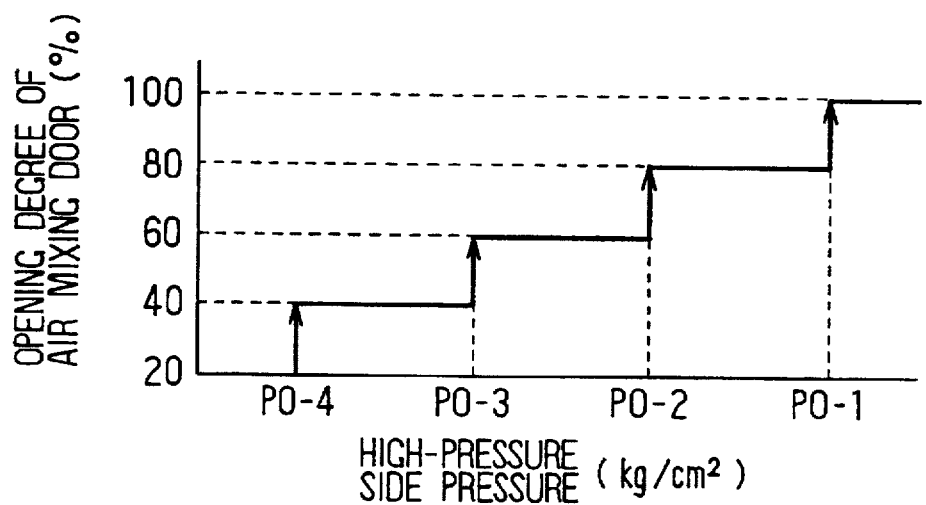
FIG. 8 is a characteristic graph showing a relationship between high-pressure side pressure and an opening degree of the air mixing door in the heating operation according to a second embodiment of the present invention.

The air mixing door 16 is actuated by an electric actuator such as a servomotor, and the opening degree of the air mixing door 16 is determined based on the actual high pressure detected by the pressure sensor 41, according to characteristics of FIG. 8 (a map stored in the ROM). In the ordinate of FIG. 8, the opening degree 100% is an opening position where the air mixing door 16 is operated to a position shown by the solid line so that all amount of air passes through the inside heat exchanger 14, whereas the smallest opening degree 20% is an opening position where 20% of the amount of the air blown by the blower 6 passes through the inside heat exchanger 14 and 80% of the air amount passes through the bypass passage 15.

Thus, in the second embodiment, by operating the air mixing door 16 to the opening degree position determined based on the actual high pressure, the amount of the air passing through the inside heat exchanger 14 is restricted within the upper limit value determined based on the actual high pressure. Therefore, even if the heating operation is performed while the air amount of the blower 6 is maintained at the set air amount BO set by the user, the high-pressure side pressure can be increased by restricting the amount of the air passing through the inside heat exchanger 14, with the result that the heating capacity can be improved.

In the second embodiment, since the smallest opening degree of the air mixing door 16 is set to 20%, even if the high-pressure side pressure lowers, the amount of the air passing through the inside heat exchanger 14 cannot be set for zero.

In the first embodiment, as shown in FIG. 6, all of the switching points for switching the air amount level of the upper limit value BP is set to interlock with the target high pressure Po; however, the switching point (PO-4) at the lowest pressure side may be fixed to a predetermined value (for example, 7 Kg/cm$^2$). In this way, the switching point for switching the air amount level from OFF to Lo-level can be fixed to the identical high pressure irrespective of the target high pressure PO.

Similarly, also in the second embodiment, the switching point (PO-4) at the smallest opening degree side of the air mixing door may be fixed to a predetermined value (for example, 7 Kg/cm$^2$).

In the first embodiment, when the actual high pressure decreases to be lower than PO-4 shown in FIG. 6, the blower 6 is stopped; however, without stopping the blower 6, the predetermined smallest amount of air may pass through the inside heat exchanger 14, as in the second embodiment.

In this way, even if the high-pressure side pressure lowers, it is prevented for the user to misunderstand that the air conditioning apparatus is out of order when the blower stops for a long time.

In each of the first and second embodiments, the high-pressure side pressure of the refrigeration cycle is directly detected by the pressure sensor 41; however, without detecting the high-pressure side pressure, a temperature of the air having been just blown out from the inside heat exchanger 14 may be detected, and the upper limit value BP of the amount of the air passing through the inside heat exchanger 14 may be determined based on this detection temperature. Similarly, a temperature of the gas refrigerant discharged from the compressor 22 may be detected. The important thing is that any kinds of physical values relative to the high-pressure side pressure of the refrigeration cycle may be detected.

In each of the first and second embodiments, the air amount of the blower 6 is set by the air amount switching lever 52 which is manually operated; however, it has been known well that the air amount of the blower 6 is automatically set based on the target temperature of the blown-air in the automotive air conditioning apparatus, and the present invention may be employed in such an air amount automatic setting type. In this case, in the flow chart of FIG. 5, since the set air amount BO at step 105 is set to the air amount which is automatically set, the blower operates with the air amount which is automatically set.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A gas injection type heat pump apparatus comprising:
    a blower for blowing air;
    a casing for forming an air passage through which air blown by said blower flows;
    a compressor having a suction port for sucking refrigerant having a low pressure, a refrigeration cycle, a gas injection port for introducing gas refrigerant having an intermediate pressure, and a discharge port for discharging the compressed refrigerant having a high pressure;
    an inside heat exchanger disposed in said air passage, for performing heat exchange between the blown air and the refrigerant;
    an outside heat exchanger disposed outside said air passage, for performing heat exchange between outside air and the refrigerant;
    first decompressing means for decompressing the high-pressure side pressure to an intermediate pressure;
    a gas-liquid separator for separating the refrigerant decompressed in said first decompressing means into gas refrigerant and liquid refrigerant;
    introducing means for introducing the gas refrigerant separated in said gas-liquid separator into said gas injection port;
    second decompressing means for decompressing the liquid refrigerant; and
    physical amount detecting means for detecting a physical amount relative to the high-pressure side pressure of the refrigeration cycle,
    air amount upper limit value determining means for determining an upper limit value based on the physical amount detected by said physical amount detecting means, wherein,
    the refrigerant flows in the order of said compressor, said inside heat exchanger, said first decompressing means, said gas-liquid separator, said second decompressing means, and said outside heat exchanger in a heating operation, and
    an amount of air passing through said inside heat exchanger in the heat operation is restricted to the upper limit value.

2. A gas injection type heat pump apparatus according to claim 1, further comprising:
    air amount setting means for setting an amount of air passing through said inside heat exchanger;
    determining means for determining whether a set air amount set by said air amount setting means is larger than the upper limit value;
    first control means for controlling the amount of air passing through said inside heat exchanger to said upper limit when said determining means determines that the set air amount set by said air amount setting means is larger than the upper limit value; and
    second control means for controlling the amount of air passing through said inside heat exchanger to the set air amount set by said air amount setting means when said determining means determines that the set air amount set by said air amount setting means is smaller than the upper limit value.

3. A gas injection type heat pump apparatus according to claim 1, wherein the amount of the air passing through said inside heat exchanger is restricted by controlling an amount of air blown by said blower.

4. A gas injection type heat pump apparatus according to claim 3, wherein said blower is stopped when the upper limit value is lower than a predetermined value.

5. A gas injection type heat pump apparatus according to claim 1, wherein the physical amount detected by said physical amount detecting means is the high-pressure side pressure of the refrigeration cycle.

6. A gas injection type heat pump apparatus according to claim 5, wherein said physical amount detecting means is a pressure sensor for detecting a pressure of the refrigerant from said discharge port of said compressor.

7. A gas injection type heat pump apparatus according to claim 2, wherein said air amount setting means is manually controlled.

8. A gas injection type heat pump apparatus according to claim 1, wherein the upper limit value is controlled according to the physical amount detected by said physical amount detecting means in a stepwise manner.

9. A gas injection type heat pump apparatus according to claim 1, further comprising:
    a door member for separating air passing through said inside heat exchanger and air bypassing said inside heat exchanger.

10. A gas injection type heat pump apparatus according to claim 9, wherein the amount of the air passing through said inside heat exchanger is restricted by controlling an opening degree of said door member.

11. A gas injection type heat pump apparatus according to claim 10, wherein the smallest value of said opening degree of said door member is set in such a manner that a predetermined amount of air passes through said inside heat exchanger.

* * * * *

UNITED STATES PATENT AND TRADEMARK OFFICE
CERTIFICATE OF CORRECTION

PATENT NO. : 5,778,691
DATED : July 14, 1998
INVENTOR(S) : Takahisa Suzuki et al.

It is certified that error appears in the above-identified patent and that said Letters Patent is hereby corrected as shown below:

Title page,
Item [73], Assignee, insert second Assignee -- Nippon Soken, Inc., Nishio, Japan --

Signed and Sealed this

Twenty-ninth Day of June, 2004

JON W. DUDAS
*Acting Director of the United States Patent and Trademark Office*